3,054,886
CONTROL FOR MANUAL SIGMA SPOT WELDER

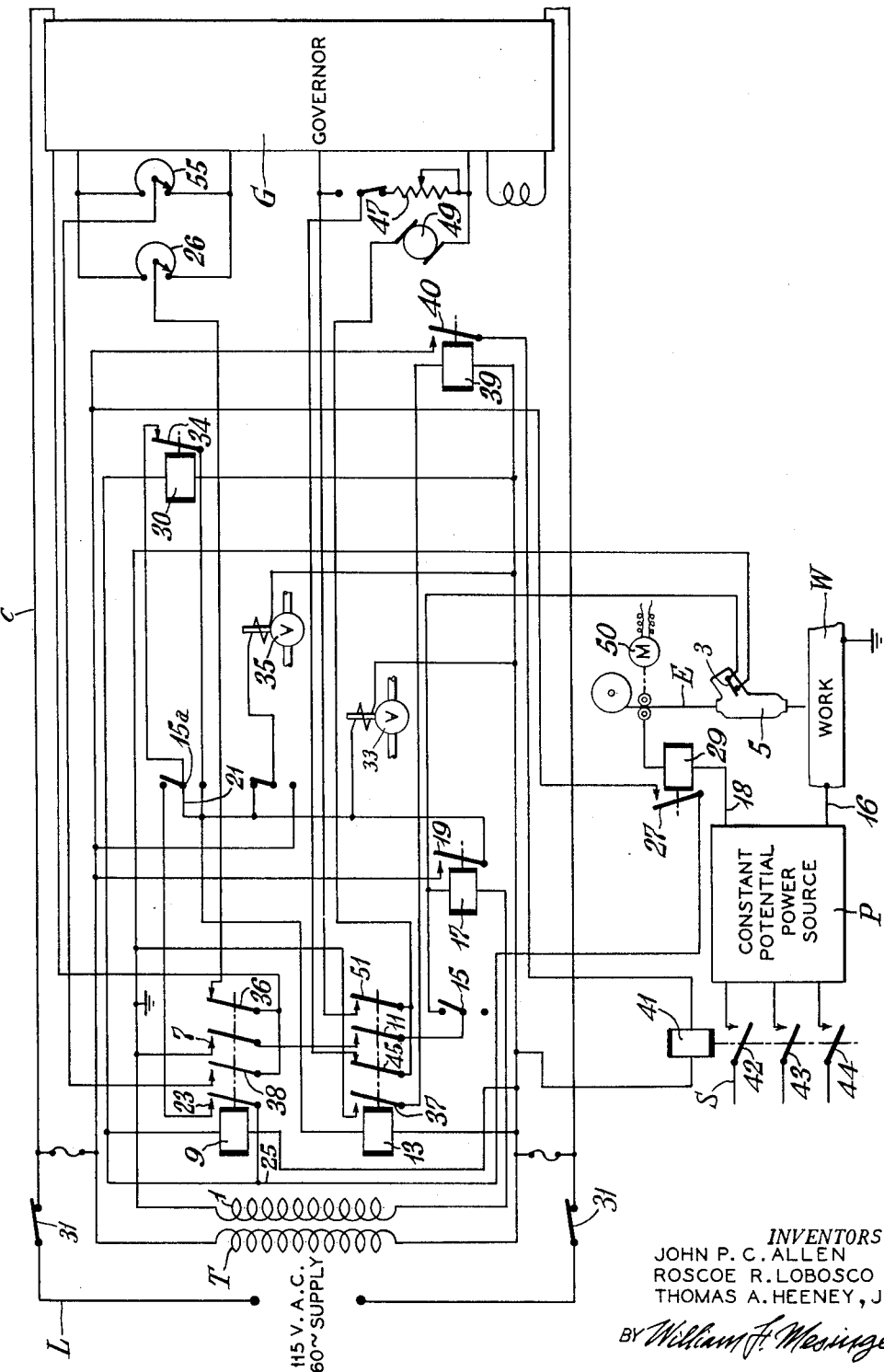

John P. C. Allen and Roscoe R. Lobosco, Fanwood, and Thomas A. Heeney, Jr., Summit, N.J., assignors to Union Carbide Corporation, a corporation of New York
Filed June 23, 1960, Ser. No. 38,199
10 Claims. (Cl. 219—131)

This invention relates to a consumable electrode wire welding system, and more particularly to a system for spot welding by the sigma (shielded-inert-gas-metal-arc) process. An example of sigma spot-welding is disclosed in Essig, 2,776,361.

Heretofore the successful operation of the sigma spot-welding process required the use of complex costly welding controls which included a current relay for arc detection. Such current relays are sensitive to fluctuations in welding current and may open and close rapidly or "chatter" as a result of such fluctuations. With present controls, this chatter leads to a control malfunction resulting in an erratic weld. As a consequence, the range of welding conditions is limited to those within which the welding current is sufficiently steady to prevent the relay from chattering. Naturally, certain materials can not be joined with any degree of consistency when chattering is present.

In prior art controls as many as nine switching relays were necessary to perform automatically the functions demanded by the welding process. The numerous components rendered such an automatic unit practically immobile and thus rendered it useles for certain applications. Furthermore, the overall expense of the unit placed it in an unfavorable competitive position with simpler units requiring a hinger degree of operator skill. However, with the present invention, the undesirable effects of current relay chatter are eliminated without sacrificing simplicity. At the same time, all of the functions of the more complex control are accomplished using fewer components than heretofore. Though the control has fewer operating components, nevertheless it is fully automatic and requires no more operator skill than with the previous automatic control.

Accordingly, it is the main object of this invention to provide an arc control system including circuitry for locking-in or by-passing the means for starting the spot-welding cycle, thus taking control away from the operator, and for by-passing the welding current relay means and thus render the welding operation independent of the welding current relay.

Other objects are to provide a simple, compact, economical arc control system which possesess all the advantages and none of the disadvantages of the prior art controls and to provide a sigma spot-welding control which makes the spot-weld timing indepednent both of the operator and of current relay malfunction during the timing period.

Other advantages and objects will be pointed out or become apparent from the description and drawing found herein.

In the arc control system according to the invention there is provided a control circuit which comprises a first locking circuit including contacts which close to make such first locking circuit for by-passing the arc current initiating means after such means is actuated. Normally in the case of a sigma gun the arc current initiating means is a trigger switch. A second locking circuit is provided including contacts which close to make such second locking circuit for by-passing arc responsive means once such means has been effectuated in response to the presence of an arc and has operated to close, at substantially the same time as the beginning of arc timing period, both the first and the second locking circuits.

For a more complete understanding of the invention, reference should be made to the following detailed description and drawing in which the single FIGURE is a wiring diagram of the invention. In the embodiment of the invention shown in the drawing and described hereinafter, reference is made to a sigma spot-welding process. It is to be understood that the inventive control may be utilized in continuous seam welding and in non-gas shielded and flux shielded welding processes.

Referring to the drawing, the control C is connected in circuit relation with a governor G, an arc power P supply, a consumable electrode E and a workpiece W. The control C operates from a 115 volt A.C. 60 cycle line L. The power source is connected to a 220/440 volt 3-phase A.C. 60 cycle line S.

The unique features of the invention are obtained by providing two locking circuits for locking-in or by-passing the arc start means and the welding current relay. The first locking circuit comprises the secondary side 1 of transformer T connected in parallel to the arc start means 3 in the gun 5 and to one side of normally open contacts 7 of transfer relay coil 9. The other side of contacts 7 connect to normally open contacts 11 of wire feed relay 13 which contacts, in turn, are connected through function switch 15 to start relay coil 17 back to the other side of the secondary 1 of transformer T. The second locking circuit comprises the normally open contacts 19 of start relay coil 17 connected to one side of the line L, the other side of such contacts 19 is connected through one leg 21 of a parallel branch to function switch 15a (the second pole of a double pole switch) then to a second set of normally open contacts 23 of transfer relay coil 9. The other side of the contacts 23 is connected to a parallel branch 25. One leg is connected through normally open contacts 27 of welding current relay coil 29 to the line L. The other leg is connected back through transfer relay coil 9 to the line L.

The normal welding cycle is capable of being initiated as soon as the control is properly connected for welding, together with the governor switch 31 (a double-pole, single-thrown switch) in the "on" position.

Once the normally open external start means 3 are closed, the start relay 17 is instantaneously energized. The normally open contact 19 of relay 17 closes and activates the wire feed relay 13 and the gas and water solenoid valves 33 and 35, respectively.

Normally open contact 37 of wire feed relay 13 closes, energizing the anti-stick time delay relay 39. Normally open contact 40 of anti-stick time delay relay 39 closes, immediately energizing the welding contactor 41. Normally open contacts 42, 43, and 44 of contactor 41 close, energizing the welding power supply P. Welding power is supplied to the electrode wire E and workpiece W through cables 18 and 16, respectively. Normally closed contact 45 of relay 13 opens, disconnecting the dynamic breaking resistor 47 from the armature 49 of electrode wire feed motor 50. Normally open contact 51 of relay 13 closes, connecting the armature 49 of motor 50 to the power circuit of electronic governor G. Motor 50 begins to feed electrode E towards workpiece W at a slow speed controlled by the inch speed potentiometer 26. Normally open contact 11 of relay 13 closes, priming the first locking circuit around extrnal start means 3.

Electrode wire E feeds down until it contacts workpiece W and burns back to initiate an arc. Once welding current flows, the welding current relay 29 is energized and normally open contact 27 of relay 29 closes, energizing weld timer 30 and transfer relay 9. Weld timer 30 is a time delay relay of the pneumatic type providing a delay period between the time when it is energized and the time when its normally closed contact 34 opens.

Normally open contact 23 of transfer relay 9 closes, locking the circuit of welding timer 30 and relay 9 through normally open contact 19 of relay 17. Normally closed contact 36 of relay 9 opens and normally open contact 38 of relay 9 closes, transferring control of the speed of motor 50 from potentiometer 26 to the welding control potentiometer 55. Normally open contact 7 of relay 9 closes and locks the first locking circuit to relay 17 through normally open contact 11 of relay 13. From this time until the conclusion of the cycle, operation of external start means 3 can have no effect upon the control action.

At the conclusion of the timing period as governed by weld timer 30, its normally closed contact 34 opens, de-energizing relay 13. Normally open contact 37 of relay 13 opens, de-energizing time delay relay 39. Normally open contact 51 of relay 13 opens, disconnecting the armature 49 of motor 50 from the power circuit of electronic governor G. Normally closed contact 45 of relay 13 closes, connecting the armature 49 of motor 50 to the dynamic braking resistor 47. Resistor 47 dissipates the stored energy from armature 49 bringing motor 50 rapidly to a stop. Normally open contact 11 of relay 13 opens, unlocking the circuit around external start means 3. If external start means 3 are still closed, this has no effect. If external start means 3 are open, relay 17 is de-energized. If relay 17 is de-energized, normally open contact 19 of relay 17 opens, unlocking the circuit to timer 30 and relay 9. However, since contact 40 of time delay relay 39 is still closed and welding current is still flowing, relay 29 remains energized and its normally open contact 27 keeps timer 30 and relay 9 energized.

Anti-stick time delay relay 39 is a time delay relay of the pneumatic type similar to timer 30 except that it is arranged to give a time delay when it is de-energized. At the conclusion of the time delay period, normally open contact 40 of time delay relay 39 opens and de-energizes the welding contactor 41. Normally open contacts 42, 43, and 44 of contactor 41 open, de-energizing welding power supply P and interrupting the flow of welding current around the path formed by elements 18, E, W and 16. Relay 29 is de-energized and its normally open contact 27 opens de-energizing timer 30 and relay 9, unless external start means 3 are still closed. In the latter case, relay 17 remains energized and its normally open contact 19 keeps timer 30 and relay 9 energized through normally open contact 23 of relay 9 until external start means 3 are opened.

As long as external start means 3 remain closed, normally open contact 19 of relay 17 also remains closed, solenoid valve 33 remains energized permitting the flow of shielding gas after the arc has been extinguished, thus providing a post-flow shielding to the weldment. As soon as timer 30 has completed its cycle and external start means 3 have been reopened, the control sequence is complete and another cycle may be started.

External start means 3 are under the control of a welding operator who is required to operate means 3 to initiate a welding cycle. In some prior control the operator has been required to keep means 3 closed for the duration of the entire welding cycle. In still others, it has been necessary to close means 3 briefly but to open it before the conclusion of the welding cycle. Either of the above alternatives has been found to require a measure of operator skill so that more recent controls have included separate and distinct circuits to make the operation of the control independent of the condition of external start means 3.

In the present control, this function is accomplished by using components which form an integral part of the control and eliminate the need for using separate and distinct circuits. Specifically, this locking function is accomplished by using contacts 7 and 11 to by-pass the external start means 3.

In the course of a welding cycle, normally open contact 11 of relay 13 closes as soon as the external start means 3 are closed, and normally open contact 7 of relay 9 closes as soon as a welding arc is initiated. When these two contacts 7 and 11 are closed in combination, the locking circuit which by-passes external start means 3 (keeping relay 17 energized) is operative.

After weld timer 30 completes its timing period and its normally closed contact 34 opens, relay 13 is de-energized and its normally open contact 11 opens, interrupting the locking circuit and returning control of start relay 17 to the external start means 3.

Welding current relay 29 is responsive to the flow of welding current and its normally open contact 27 closes as soon as an arc is initiated, to energize weld timer 30 and relay 9. It is necessary that both timer 30 and relay 9 shall remain energized for the duration of a welding cycle or the welding cycle will be erratic. In prior controls, relay 29 solely controlled timer 30 and relay 9, so that if relay 29 opened during the welding cycle, an erratic weld resulted.

There are two sets of circumstances under which relay 29 may open during the course of a welding cycle. The first occurs when the welding process conditions dictate a current lower than that at which relay 29 will remain energized. The second is when the welding process conditions result in a current flow which is erratic so that relay 29 chatters, that is, it opens and closes rapidly.

In the present circuit, normally open contact 19 of relay 17 and normally open contact 23 of relay 9 form a second locking circuit around normally open contact 27 of relay 29 so that once contact 27 has closed initially, it no longer has any effect upon the circuit operation.

The essential elements utilized in the above locking circuits are relays 17, 13 and 9 and their contacts 19, 11, 23 and 7. Each of these three relays has a separate function in the operation of the control apart from its locking function. Relay 13 initiates the feeding of the electrode wire E by energizing motor armature 49 and also controls welding contactor 41. Relay 9 transfers control of the wire feed speed from potentiometer 26 to potentiometer 55. Both of these functions are necessary to the operation of the control. Relay 17 is a relay permitting the use of a reduced voltage in the external start circuit. This is a function dictated by safe electrical practice.

It is not necessary to utilize relay 17 in order to practice the foregoing invention; but the locking circuit formed by 7 and 11 should by-pass the external start means 3. Relay 17 and its associated circuitry could be eliminated and normally open contacts 17 could be considered as the external start means without affecting the essential operation of the control. In such a case, the locking circuit formed by normally open contacts 7 and 11 would be connected to by-pass normally open contact 19.

The portion of the circuit which is used to obviate the undesirable effects of malfunction of the current relay is applicable to welding processes other than sigma spot-welding. It has application to any welding control which includes in its elements:

(1) Means to initiate a welding operation.
(2) Means responsive to the initial establishment of a welding arc (such as a current relay, arc voltage relay, etc.) and where the operation of the second means above is erratic or intermittent after the initial establishment of the arc.

What is claimed is:

1. An arc system comprising in combination with an electrode and a workpiece; an arc energizing circuit including an arc power supply connected in circuit relation with said electrode and said workpiece; means for detecting the presence of an arc between said electrode and workpiece; and a control circuit comprising an arc timing circuit and a locking circuit for locking in said arc timing circuit including a relay and its associated contacts, said relay being energized in response to said arc detection means thereby operating the contacts associated with said relay to lock-in said relay and said arc timing circuit and thereby by-pass said arc detection means once said means has been energized.

2. A system according to claim 1 wherein said locking including means for de-energizing said locking circuit after a predetermined arc duration.

3. A consumable wire electrode arc system comprising in combination with a consumable electrode wire and means for feeding said wire from a source thereof to a workpiece; an arc energizing circuit including an arc power supply connected in circuit relation with said consumable wire electrode and said workpiece; means for initiating arc current in said arc energizing circuit; and a control circuit comprising a locking circuit including relay means for closing such circuit for by-passing said arc current initiating means once such means is actuated, and an arc timing circuit including an arc timer for timing the duration of said arc, both of said last-named circuits being effectuated at substantially the same time by means connected in said arc energizing circuit responsive to the ignition of an arc struck between said consumable electrode and said workpiece.

4. A system according to claim 3 wherein said arc timing circuit includes means for de-energizing said locking circuit after a predetermined arc duration.

5. A consumable wire electrode arc system comprising in combination with a consumable electrode wire and means for feeding said wire from a source thereof to a workpiece; an arc energizing circuit including an arc power supply connected in circuit relation with said consumable wire electrode and said workpiece; means for initiating arc current in said arc energizing circuit; and a control circuit comprising a first locking circuit including means for closing said first locking circuit to by-pass said arc current initiating means once such means is actuated, an arc timing circuit including arc timer for timing the duration of said arc, both of said last-named circuits being effectuated at substantially the same time by means connected in said arc energizing circuit responsive to the ignition of an arc struck between said consumable electrode and said workpiece and a second locking circuit having means for closing said second locking circuit upon the effectuation of said arc timing circuit to by-pass said arc responsive means connected in said arc energizing circuit.

6. A system according to claim 5 wherein said arc timer in said arc timing circuit operates at the end of a predetermined arc period to de-energize said first and second locking circuits.

7. A consumable wire electrode arc welding system comprising the combination with a consumable electrode welding wire and means for feeding said welding wire from a source thereof to a workpiece to be welded, of a welding arc energizing circuit including a welding power source connected in welding circuit relation with said welding wire electrode and said workpiece, start means for initiating the flow of welding current in said welding arc circuit, and of a control circuit comprising a first locking circuit including means for closing said first locking circuit to by-pass said start means after such means is actuated, a welding arc timing circuit including a weld timer for timing the duration of said welding arc, both of said last-named circuits being effectuated at substantially the same time by relay means connected in said welding arc circuit responsive to the ignition of a welding arc struck between said welding wire and said workpiece, and a second locking circuit having means for closing said second locking circuit upon the effectuation of said welding arc timing circuit for by-passing said arc responsive relay means connected in said welding arc energizing circuit.

8. A system according to claim 7 including means for supplying gas to gas shield said welding arc.

9. A system according to claim 7 wherein said start means is a switch and said relay means connected in said welding arc circuit is a current relay responsive to the flow of welding current in said welding arc circuit.

10. A sigma spot welding arc system comprising the combination with a sigma gun and a welding arc energizing circuit including a welding power supply for supplying welding power between a consumable electrode welding wire and work to be spot welded; of starting means initiating the flow of current in said welding arc energizing circuit to establish an arc between said electrode wire and said work; and of a control circuit comprising means for feeding such welding electrode wire at relatively slow speed toward such work, means for continuously gas shielding such arc, each of said last-named means being effectuated by said starting means, relay means having at least three sets of contacts, and a weld timing circuit including a weld timer for timing the duration of the weld cycle and including the coil of said last-named triple contact relay means, said weld timing circuit being closed by the contacts of current relay means having a coil connected in said weld energizing circuit such coil being energized in response to the initiation of said arc, whereupon said triple contact relay coil connected in said weld timing circuit is energized to actuate said three sets of contacts associated therewith, the first set of such contacts closes to form a locking circuit around said starting means, the second set of contacts closes to form a locking circuit around the contacts of said current relay means and the third set of contacts operate to increase the feed of said welding electrode wire from said relatively slow speed to welding speed.

References Cited in the file of this patent

UNITED STATES PATENTS

| | | |
|---|---|---|
| 2,067,153 | King | Jan. 5, 1937 |
| 2,364,372 | Kenrick | Dec. 5, 1944 |
| 2,776,361 | Essig | Jan. 1, 1957 |
| 2,806,127 | Hackman et al. | Sept. 10, 1957 |
| 2,845,526 | Cameron et al. | July 29, 1958 |